(12) United States Patent
Wai et al.

(10) Patent No.: US 10,834,286 B1
(45) Date of Patent: Nov. 10, 2020

(54) SYSTEM AND METHOD FOR DETERMINING RECIPIENT INFORMATION FROM A DOCUMENT

(71) Applicant: Toshiba TEC Kabushiki Kaisha, Shinagawa-ku (JP)

(72) Inventors: Brendon Wai, Lake Forest, CA (US); Kevin T. Nguyen, Lake Forest, CA (US); Sai Geetha Kandepalli Cherukuru, Lake Forest, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/456,184

(22) Filed: Jun. 28, 2019

(51) Int. Cl.
*H04N 1/00* (2006.01)
*H04N 1/32* (2006.01)

(52) U.S. Cl.
CPC ..... *H04N 1/32037* (2013.01); *H04N 1/00209* (2013.01); *H04N 1/00331* (2013.01); *H04N 1/00411* (2013.01); *H04N 1/00413* (2013.01); *H04N 2201/0094* (2013.01)

(58) Field of Classification Search
CPC ........... H04N 1/32037; H04N 1/00411; H04N 1/00331; H04N 1/00413; H04N 1/00209; H04N 2201/0094

USPC ........................................................ 358/1.15
See application file for complete search history.

(56) References Cited

U.S. PATENT DOCUMENTS

| 2004/0125414 | A1* | 7/2004 | Ohishi | H04N 1/00411 358/402 |
| 2009/0161158 | A1* | 6/2009 | Fujikawa | H04L 51/066 358/1.15 |
| 2016/0241736 | A1* | 8/2016 | Saluja | H04L 51/10 |

\* cited by examiner

*Primary Examiner* — Saeid Ebrahimi Dehkordy
(74) *Attorney, Agent, or Firm* — Ulmer & Berne LLP

(57) ABSTRACT

A system and method for determining where to send a document from information printed on the document includes a scanner configured to scan a document, and a processor configured to use optical character recognition on the scanned document to determine recipient contact information. The processor generates a user-selectable list of one or more of the determined recipients and receives a user selection of one or more recipients to receive the document. The processor then transmits the document to the selected recipients using a modality suitable to the recipient's contact information, which includes faxing the document to the recipient when the recipient's contact information is a fax number, emailing the document to the recipient when the recipient's contact information is an email address, and transmitting the document when the recipient is a network file server.

18 Claims, 3 Drawing Sheets

SYSTEM AND METHOD FOR DETERMINING RECIPIENT INFORMATION FROM A DOCUMENT

TECHNICAL FIELD

This application relates generally to determining where to send a document from information printed on the document. The application relates more particularly to scanning a document on a multifunction peripheral and using optical character recognition to determine recipients for the document from contact information printed on the document.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are commonly used to scan a document which is then sent to one or more recipients, for example by faxing the scanned document or by emailing the scanned document. A user is typically required to manually enter the recipient's fax number or email address in order to forward the scanned document to a recipient. When a user intends to send the document to several recipients, the user can be required to enter the contact information for each of the recipients which can be labor intensive and result in errors, such as mistyped information or missed entries.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

As described above, when a user desires to fax or send a document to one or more recipients, the user manually enters the recipients' contact information via a user interface or selects a recipient from an address book. For example, on an MFP the user scans the document and enters the recipients' address information via a front panel user interface, which can include a fax number, an email address, or a file server address depending on the intended recipient. The user may also be presented with the user's address book, allowing the user to search for recipients by name or other identifying indicia.

In accordance with an example embodiment, a multifunction peripheral includes a scanning engine configured to scan a document, a memory configured to store the scanned document, and a processor configured to use optical character recognition (OCR) on the scanned document to determine recipient contact information and generate a list of recipients, and a user interface configured to present the list to the user and prompt the user to select a recipient from the determined recipient contact information. The processor then transmits the scanned document to the selected recipients.

In accordance with further example embodiments, a method includes scanning a document, performing OCR on at least some of the document, and determining identifying indicia of a destination address. The method includes displaying the identifying indicia to a user, receiving a user selection of one or more destination addresses for the document, and sending the document to the selected destination addresses.

In accordance with further example embodiments, a system includes a processor configured to receive a digital image of a scanned document, and determine recipient addresses that are printed on the scanned document. The processor generates a user selectable list of one or more recipient addresses and displays them to the user via an associated user interface. The processor sends the scanned document to the recipient addresses selected by the user.

Figure 1:
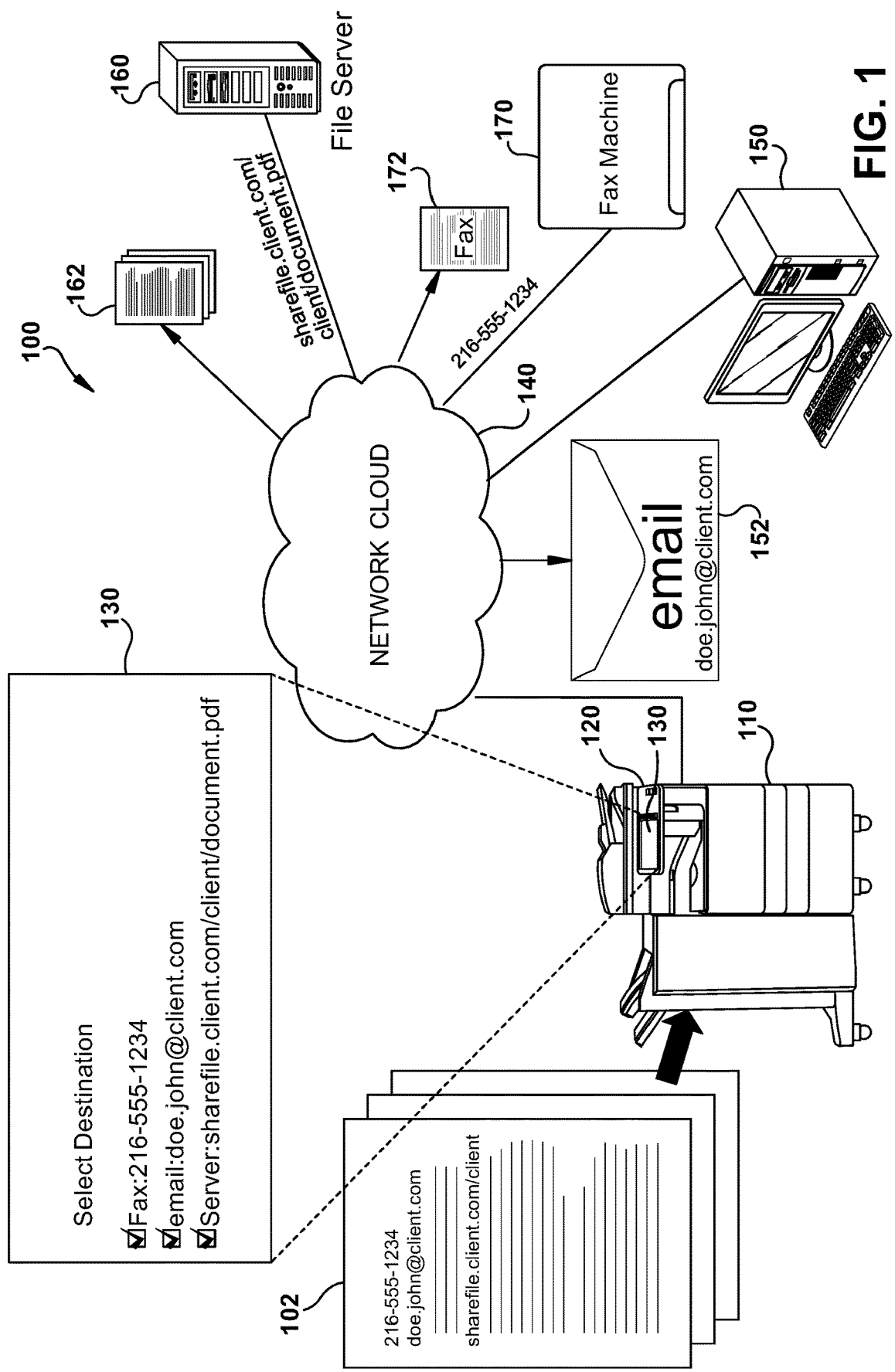
FIG. 1 is an example embodiment of a system for extracting recipient address information printed on scanned document.

In accordance with the subject application, FIG. 1 illustrates an example embodiment of a system 100 for extracting recipient address information printed on a scanned document. The system includes a networked MFP such as MFP 110. When a user desires to send a document 102 to a recipient, the user scans the document 102 on the MFP 110 via a scan engine or scanner 120 of the MFP 110. The MFP 110 performs optical character recognition, or OCR, on the scanned document 102 and determines if the document 102 includes suitable address or contact information that matches a particular format. For example, if the document 102 is a fax, the document may include a fax cover sheet with the fax numbers of one or more fax machines 170 that are to receive the faxed document 172. The document 102 may include other suitable contact information, such as an email address of an intended recipient to receive the document by email 152 on their computing device 150, or a network address of a file server 160 to receive a copy of the document 162. In various embodiments, any suitable identifying indicia can be extracted by the MFP 110, including but not limited to phone numbers, fax numbers, email addresses, network server addresses, contact names, and so forth.

The MFP 110 can perform OCR on any suitable portion or portions of the document. For example, the MFP 110 can perform OCR only on the text portions of a document and ignore headers, pictures, and so forth. In the case of a fax, the MFP 110 can identify relevant portions of a fax cover sheet from which to obtain the contact information. As fax cover sheets often include the sender's own fax number and a contact number to call in case of difficulties, the MFP 110 can skip performing the OCR on those parts, or remove that scanned contact information when checking the contact information against the user's address book as described below.

The MFP 110 extracts the contact information and presents the contact information to the user in a list via a suitable user interface, for example the front panel 112 of the MFP 110. The user selects the desired recipient or recipients from the list and the MFP 110 sends the scanned document to the recipient or a network location. For example, if the selected contact info is a fax number, the MFP 110 can send the document via a fax engine to the recipient. In another example, if the selected recipient is an email address, the MFP 110 can forward the document to the user via email. In embodiments, the user can select a desired format for the document, which can be sent as an attachment of the email as an uncompressed image such as a TIFF file, as a compressed image such as a JPG file, or in a portable document format or PDF or any other suitable format. The document can be sent via network cloud 140, suitably comprise of a local area network (LAN), a wide area network (WAN) which may comprise the Internet, or any suitable combination thereof. Network connectivity is suitably by any wired or wireless data connection as would be understood by one of ordinary skill in the art.

The user can select one or multiple recipients from the presented list of recipients. Each of the recipients can receive the document using a different modality depending upon the type of address. For example, some users can receive a fax of the documents, while others receive the document as an attachment in an email, and still other recipients receive an image in a short message service (SMS), multimedia message service (MMS), or text message. The document can simultaneously be transmitted to a networked file server when selected as the recipient.

In embodiments, the MFP 110 can perform checks on the extracted contact information when displaying the list of contacts via the user interface. For example, the MFP 110 can compare extracted contact information with an address book associated with the user. In one example, the MFP 110 can present additional information when presenting the list to the user, for example by presenting both the recipient's fax number extracted from the document and the name of the recipient associated with the fax number from the address book of the user. In another example, the user can be presented with additional addresses associated with the recipient, allowing the user to select additional delivery methods, for example sending the document via email instead of via the provided fax number extracted from the document. In another example, the MFP 110 can compare the extracted contact with the user's known contacts and allow the user to create a new contact or modify an existing contact in the user's address book.

Figure 2:
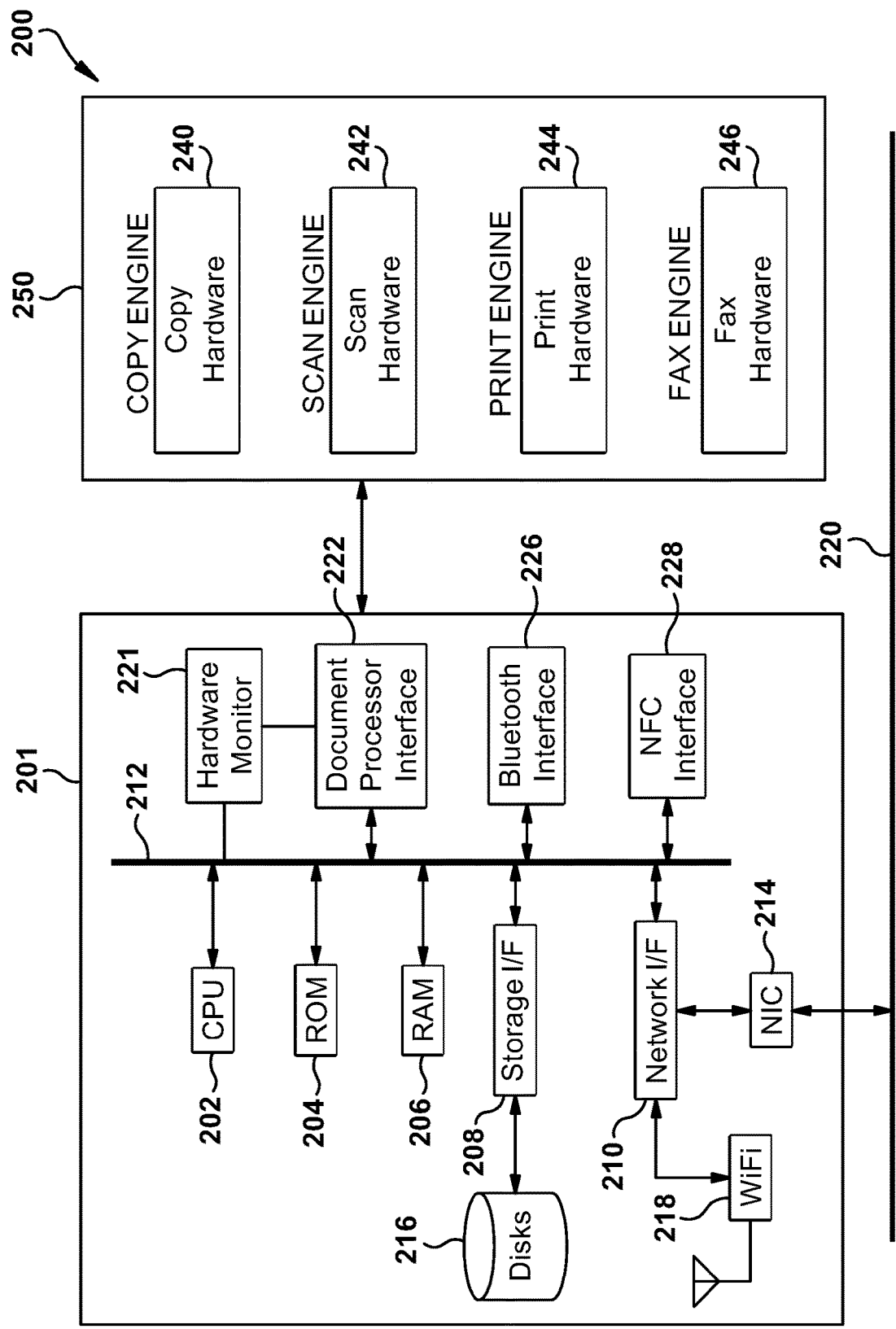
FIG. 2 is an example embodiment of a networked digital device such as a multifunction peripheral.

Turning now to FIG. 2 illustrated is an example embodiment of a networked MFP, such as MFP 110 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
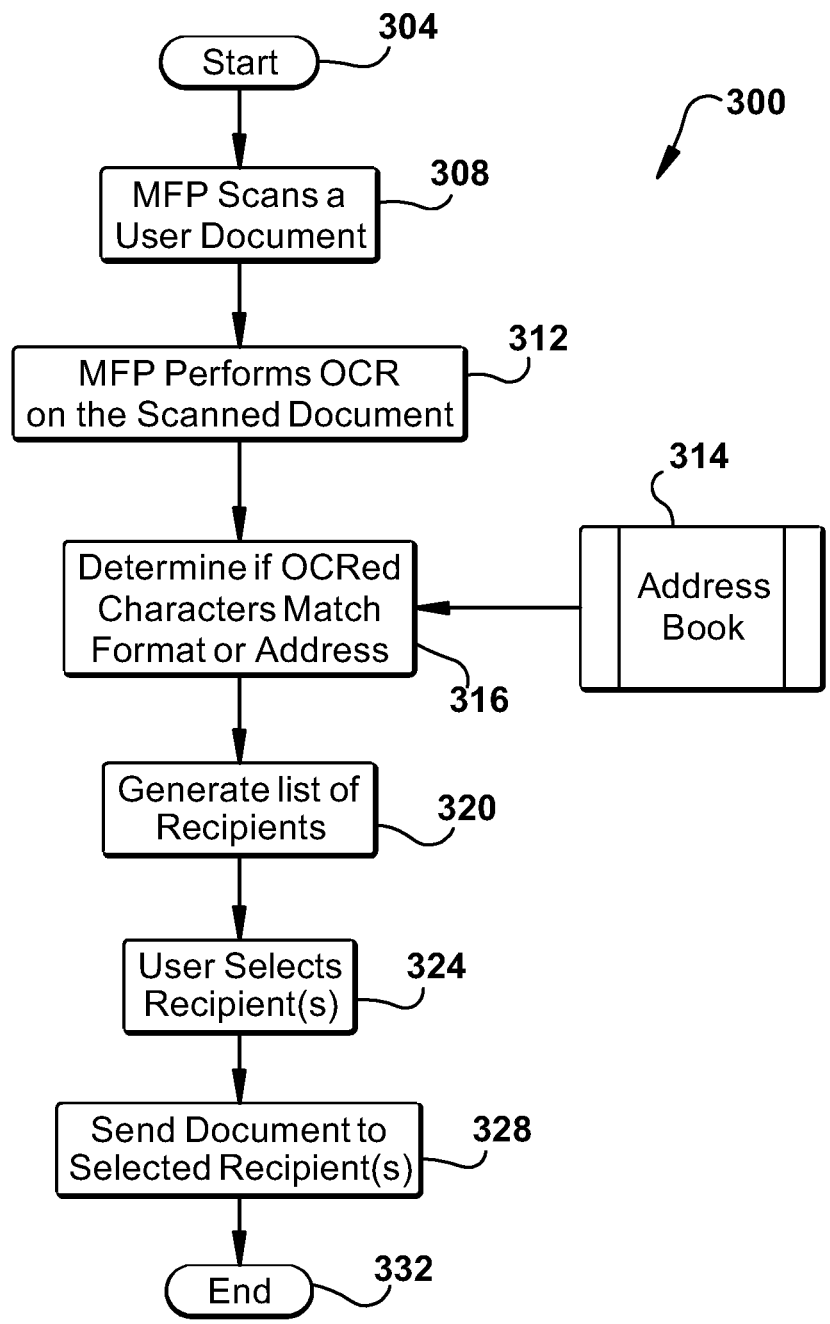
FIG. 3 is a flowchart of an example embodiment of a system for extracting recipient address information printed on a scanned document.

Turning now to FIG. 3, a flowchart 300 of a system for extracting recipient destination information from a scanned document is presented. The process commences at block 304 and proceeds to block 308 where the MFP scans a document provided by the user. The document can include one or more pages. At block 312, the MFP performs OCR on the image of the scanned document. At block 316, the MFP determines whether the OCRed image includes address or routing information. For example, the MFP can determine if OCRed characters from the document match the format of fax numbers, email addresses, or network addresses among other possible suitable address formats. The MFP can optionally match OCRed recipients with entries in the user's address book 314.

At block 320, the MFP can generate a list of potential recipients and at block 324 the user can select one or more recipients from the list to receive the document. If desired, entries of the list of potential recipients are suitably compared against existing address information, such as information in a stored address book. Such comparison may identify discrepancies or errors between extracted destination information and stored information. A user is suitably prompted relative to the discrepancy. Depending on the discrepancy, the user may correct extracted information to account for erroneously entered information or information that was incorrectly OCRed. In other situations, the user may realize that stored address information is outdated and updates it with new information extracted via the OCR. In other situations, extracted information may not be in the existing address database which may provide an indication that the destination is not approved or acceptable for transmission. The MFP can optionally display additional recipient information as described above and the user can optionally select to send the document to the recipient using a different modality, for example selecting to send the document via email instead of as a fax. Example modalities can include a fax, a text message, an email, a file transfer protocol (FTP) session for transferring files to a network server, and so forth. At block 328, the MFP sends the document to the recipient or recipients that the user selected from the list and the process terminates at block 332.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral, comprising:
a scanning engine configured to scan a document;
a memory configured to store the scanned document;
the memory further configured to store an address book comprising a plurality of user addresses;
a processor configured to
perform optical character recognition (OCR) on the scanned document,
determine recipient contact information from the scanned document,
compare recipient contact information with the user addresses,
generate additional address information from the address book in accordance with a comparison of the recipient contact information and the user addresses,
generate a list of one or more recipients based at least in part on the determined recipient contact information; and
a user interface configured to
present the generated list to a user, and
receive a selection of one or more recipients to receive the scanned document,
wherein the processor is further configured to transmit the scanned document to the one or more selected recipients in accordance with the recipient contact information and the additional address information.

2. The multifunction peripheral of claim 1, wherein the contact information associated with a selected recipient includes a fax number and further comprising:
a fax engine,
wherein the processor is configured to transmit the scanned document to the selected recipient via the fax engine using the fax number associated with the selected recipient.

3. The multifunction peripheral of claim 1, wherein the contact information associated with a selected recipient includes an email address and further comprising:
a network interface,
wherein the processor is configured to transmit the scanned document to the selected recipient via the network interface using the email address associated with the selected recipient.

4. The multifunction peripheral of claim 1, wherein the contact information associated with a selected recipient includes an address of a network server and further comprising:

a network interface,
wherein the processor is configured to transmit the scanned document to the network server via the network interface.

5. The multifunction peripheral of claim 1, wherein the processor generates the list comprising a plurality of recipients, wherein the user interface is further configured to receive a plurality of selections of recipients to receive the scanned document from the user, and wherein the processor is further configured to transmit the scanned document to each of the selected recipients using a modality associated with the contact information of each selected recipient.

6. The multifunction peripheral of claim 5, wherein the modality is selected from the group consisting of a fax, an email, a text message, and a file transfer protocol (FTP) session.

7. The multifunction peripheral of claim 1, wherein the user interface comprises a touchscreen configured to display the list and receive the user selection.

8. A method, comprising:
scanning a document;
retrieving user addresses from a stored address book;
performing optical character recognition (OCR) on at least a portion of the document;
determining identifying indicia of a destination address for the document based at least in part on the OCR portion of the document;
comparing determined identifying indicia to user addresses in the address book;
generating additional address information from the address book in accordance with a comparison of the identifying indicia to the user addresses;
displaying at least one of the identifying indicia to a user for selection;
receiving, from the user, a selection of at least one of the identifying indicia as the destination address for the document;
displaying additional address information;
receiving, from the user, a selection of at least one additional address from the displayed additional address information; and
sending the document to the selected destination address and the at least one additional address.

9. The method of claim 8, wherein the identifying indicia is selected from the group consisting of a fax number, an email address, a file server address, a telephone number, and a short message service handle.

10. The method of claim 8, further comprising:
receiving, from the user, a second selection of a second identifying indicia as a second destination address for the document; and
sending the document to the second selected destination address.

11. The method of claim 8, wherein the selected destination address comprises a plurality of different types of identifying indicia.

12. The method of claim 8, wherein the selected destination address comprises a plurality of different types of identifying indicia.

13. The method of claim 12, wherein sending comprises one or more of faxing, emailing, sms messaging, or transmitting via FTP.

14. The method of claim 8, further comprising:
generating a list of destination address from a plurality of identifying indicia,
wherein the operation of displaying includes displaying the generated list of destination addresses.

15. A system, comprising:

a processor configured to receive, from a scanner, a digital image of a scanned document, determine, from the digital image, one or more recipient addresses printed on the scanned document, retrieve address book information from a stored address book, compare the one or more recipient addresses to retrieved address book information, generate additional addresses for one or more recipient addresses in accordance with a comparison of the one or more recipient addresses with the retrieved address book information, generate a user selectable list of one or more recipient addresses and corresponding additional addresses, display, via an associated user interface, the user selectable list to a user, and send the scanned document to recipient addresses selected by the user from the user selectable list.

16. The system of claim 15, wherein the processor is further configured to determine the recipient address by performing an OCR operation on a least a portion of the digital image, and match OCRed characters from the OCR operation with one or more known recipient address formats.

17. The system of claim 16, wherein each known recipient address format is selected from the group comprising a fax number, an email address, and a network address.

18. The system of claim 16, wherein the processor is further configured to send the scanned document to each of the selected recipient addresses using a modality associated with the type of recipient address format, and wherein the modality is selected from the group consisting of a fax, an email, a text message, and an FTP transfer.

* * * * *